United States Patent
Bates et al.

(10) Patent No.: US 10,399,677 B2
(45) Date of Patent: Sep. 3, 2019

(54) CART FOR MOVING ALONG A SURFACE AND METHOD FOR MOVING A CART ALONG A SURFACE

(71) Applicant: Panasonic Avionics Corporation, Lake Forest, CA (US)

(72) Inventors: Steven Bates, Mission Viejo, CA (US); Shrenik Shah, San Juan Capistrano, CA (US); Feng Jiang, Irvine, CA (US); Philip Watson, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 15/970,466

(22) Filed: May 3, 2018

(65) Prior Publication Data
US 2019/0009910 A1   Jan. 10, 2019

Related U.S. Application Data

(60) Provisional application No. 62/528,889, filed on Jul. 5, 2017.

(51) Int. Cl.
| | | |
|---|---|---|
| B64D 11/00 | (2006.01) | |
| B65F 1/14 | (2006.01) | |
| A47B 31/00 | (2006.01) | |

(52) U.S. Cl.
CPC ........ *B64D 11/0007* (2013.01); *B65F 1/1468* (2013.01); *A47B 2031/002* (2013.01)

(58) Field of Classification Search
CPC ..... B67D 1/0857; B64D 11/0007; B62B 3/02; A47B 31/02; A47B 96/021
See application file for complete search history.

(56) References Cited

U.S. PATENT DOCUMENTS

| | | | |
|---|---|---|---|
| 3,275,393 A | * | 9/1966 | Conklin ........ A47B 31/02 219/214 |
| 6,580,915 B1 | | 6/2003 | Kroll |
| 7,936,285 B2 | | 5/2011 | Kneller et al. |

(Continued)

OTHER PUBLICATIONS

Danielle Muoio, A Robot May Show Up At Your Door Next Time You Order Room Service, Tech Insider, Feb. 9, 2016, Business Insider, published online at http://www.businessinsider.com/savioke-robot-butler-in-united-states-hotels-2016-2.

*Primary Examiner* — Hau V Phan
(74) *Attorney, Agent, or Firm* — Brian Furer (57) ABSTRACT

A cart including a housing and a first foot and a second foot mounted to the housing bottom. Each foot is moveable back and forth from a direction away from one end of the cart towards the other end, and each foot including a recess opening downwardly away from the housing bottom. The cart includes a low pressure source in fluid communication pathway extending from each recess to the low pressure source. Each fluid communication pathway includes a valve operable for opening and closing the fluid communication pathway between the recess and the low pressure source. The cart includes a first motor connected to one foot and another motor connected to the other foot, with each motor operable for moving its respective foot back and forth. The cart includes a control system connected in communication with each motor and each valve, with the control system controlling each motor to move its respective foot back and forth.

20 Claims, 6 Drawing Sheets

(56) References Cited

U.S. PATENT DOCUMENTS

| | | | |
|---|---|---|---|
| 9,303,912 B1* | 4/2016 | Schalla | A47B 96/021 |
| 2004/0195875 A1 | 10/2004 | Skelly | |
| 2008/0120187 A1* | 5/2008 | Wesley | B62B 3/02 |
| | | | 705/15 |
| 2015/0057796 A1* | 2/2015 | Boodaghians | B64D 11/0007 |
| | | | 700/236 |
| 2015/0070492 A1* | 3/2015 | Hozumi | B64D 11/0007 |
| | | | 348/143 |
| 2015/0097001 A1* | 4/2015 | Gatipon | B67D 1/0857 |
| | | | 222/108 |
| 2015/0266580 A1 | 9/2015 | Lee et al. | |
| 2019/0004540 A1 | 1/2019 | Zybala et al. | |

* cited by examiner

CART FOR MOVING ALONG A SURFACE AND METHOD FOR MOVING A CART ALONG A SURFACE

CROSS-REFERENCE TO RELATED APPLICATIONS

This application claims priority from U.S. provisional patent application Ser. No. 62/528,889, filed on Jul. 5, 2017, entitled "CART FOR MOVING ALONG A SURFACE AND METHOD FOR MOVING A CART ALONG A SURFACE." Priority to the foregoing provisional patent application is expressly claimed, and the disclosure of the provisional application is hereby incorporated herein by reference in its entirety and for all purposes.

STATEMENT RE: FEDERALLY SPONSORED RESEARCH

Not Applicable.

COPYRIGHT NOTICE

A portion of the disclosure includes material subject to copyright protection. The copyright owner has no objection to the facsimile reproduction by anyone of the patent disclosure as it appears in the Patent and Trademark Office patent file or records, but otherwise reserves all copyright rights whatsoever.

TECHNICAL FIELD

The present disclosure relates generally to carts, and more particularly to carts for use in providing service for passengers on commercial transport vehicles.

BACKGROUND

On vehicles used for commercial transport of passengers, vehicle crew frequently employ a cart to aid in providing service for passengers while the vehicle is in route to its destination. In particular, the cart is used to carry service items, such as beverages, snacks, and meals for passengers. The services items are stored in the cart in bins or shelves, and vehicle crew push the cart along aisles in the vehicle between columns of seats as each row of passengers is served. On larger aircraft, multiple carts are typically employed so that different sections of the vehicle may be serviced simultaneously. In addition, one cart may be used to provide beverages for passengers, while another cart is used to provide meals so that that passengers may be served more quickly.

While such carts are useful and reduce the workload for vehicle crew, safety issues can arise. Aircraft for example are subject to turbulence. Ocean vessels are subject to rolling and tipping in stormy conditions. Passenger vehicles on land, for example, trains and busses may be subject to rough or bumpy surface conditions. In these circumstance, a cart may tip. While most carts have brakes to prevent a cart from rolling due to motion and changes in orientation of the vehicle, the majority of carts do not include a system for holding the cart to the floor of the vehicle or other structure. During severe turbulence or bucking of a vehicle, it is possible for such a cart to fly upward relative to the vehicle and cause damage and/or passenger injury.

Moreover, there is a desire to provide automated or robotic delivery devices. For example, Savioke Inc. of San Jose, Calif., USA, has developed a delivery device marketed under the trademark RELAY for automated delivery of items in stationary environments, i.e., on land. While satisfactory for use in environments providing a stable surface for operation of the delivery device, safety issues could arise with use of such a device on vehicles for the reasons discussed above, i.e., tipping of the device due to motion or changes in orientation of the vehicle.

SUMMARY OF THE DISCLOSURE

In one aspect, the disclosure describes a cart for moving along a surface in a vehicle. The cart includes a housing having a top and bottom, and opposite ends, and a first foot and a second foot mounted to the bottom of the housing. Each foot is moveable back and forth from a direction away from one end of the cart towards the other end. Each foot also includes a recess opening downwardly away from the bottom of the housing. The cart also includes a low pressure source mounted in the housing. In addition, the cart includes a fluid communication pathway extending from an opening within each recess to the low pressure source. Each fluid communication pathway also includes a valve operable for opening and closing its respective fluid communication pathway between the recess and the low pressure source. The cart also includes a motor connected to one foot and another motor connected to the other foot, with each motor operable for moving its respective foot back and forth along the direction from one end of the cart towards the other.

The cart includes a data processor and control system executed by the data processor. The control system is connected in communication with each motor and each valve, with the control system controlling each motor to move its respective foot back and forth along the direction from one end of the cart towards the other. The control system controls the valve to remain closed for the fluid communication pathway connected to the recess of a foot as the foot moves relative to the bottom of the housing, while controlling the other valve to remain open as the other foot moves relative to the housing. The cart additionally include an electrical power source connected to the low pressure source, the motors, and data processor in which the electrical power source provides electrical power to the low pressure source, motors, and data processor.

In a further aspect, the cart includes a rail mounted to the bottom of the housing and extending along the direction from one end of the cart towards the other. Each foot is moveable along the rail. In yet a further aspect, the rail includes first and second halves, and one foot moves along one half of the rail and the other foot moves along the other half of the rail. In another further aspect, the cart includes a carriage connecting one foot to the rail, and another carriage connecting the other foot to the rail. One of the motors is operable for driving one of the carriages back and forth along the rail, along with the foot connected to that carriage, and the other motor is operable for driving the other carriage back and forth along the rail. In a still further aspect, the cart includes wheels mounted to the bottom of the housing, and at least one other motor connected to at least one wheel operable for driving the wheel.

In a different further aspect, the low pressure source includes a chamber. The chamber includes a fan disposed to draw air from the chamber when the fan is operated, with each fluid communication pathway connected in fluid communication to the chamber. In yet a different further aspect, the cart includes wheels mounted to the bottom of the housing, which roll as the housing moves along the surface of the vehicle.

In another aspect, the disclosure describes a method for moving a cart along a surface in a vehicle. The method includes using wheels to support a housing on the surface, with the housing including a bottom. The method also includes mounting a first foot and a second foot to the bottom of the housing in which each foot includes a recess facing towards the surface of the vehicle, and each foot is moveable along the bottom of the housing. The method additionally includes pressing one of the feet against the surface by reducing the pressure within the recess thereof relative to ambient, and moving the housing relative to the one foot along a direction in the vehicle. The method also includes restoring the pressure in the recess of said one of the feet to ambient after the housing has been moved, pressing the other foot against the surface by reducing the pressure within the recess thereof relative to ambient, and moving the housing relative to said other foot in the same direction. The method includes repeating the foregoing pressing and restoring until the housing has been reached a desired location in the vehicle.

In a further aspect, pressing one of the feet includes connecting a low pressure source in fluid communication with the recess in the foot to reduce the pressure in the recess below ambient. In a different further aspect, the method includes monitoring for turbulence, and if there is turbulence, pressing both feet to the surface of the vehicle by reducing the pressure in the recess of each foot concurrently. In yet another different aspect, moving the housing includes using at least one motor. In a still different further aspect, the method includes disposing a data processor in the housing and executing a control system on the data processor to coordinate the foregoing pressing, restoring, and repeating. In another different aspect, the mounting of a first foot and a second foot includes providing a rail on the bottom of the housing and attaching each foot to a carriage mounted to the rail.

In another aspect, the disclosure describes a cart for moving along a surface in a vehicle. The cart includes a housing having a top and bottom, and opposite ends. The cart includes a first foot and a second foot mounted to the bottom of the cart, with each foot moveable back and forth from a direction away from one end of the housing towards the other end. Each foot includes a recess opening downwardly away from the bottom of the housing. The cart also includes a low pressure source mounted in the housing, and a fluid communication pathway extending from an opening within each recess to the low pressure source. Each fluid communication pathway includes a valve operable for opening and closing its respective fluid communication pathway between the recess and the low pressure source. The cart includes a motor connected to one foot, and another motor corrected to the other foot in which each motor is operable for moving the foot connected thereto back and forth along the direction from one end of the housing to the other.

The cart also includes a data processor and control system executed by the data processor. The control system is connected to the motor and each valve, with the control system controlling each motor to reciprocate the foot connected thereto back and forth along the foregoing direction in coordination with opening and closing of the valves. The control system prevents movement of the housing along the surface of the vehicle by opening both valves at the same time. The cart also includes an electrical power source connected to the low pressure source, motors, and data processor, providing electrical power to the low pressure source, motors, and data processor.

In a further aspect, the cart includes wheels connected to the bottom of the housing. In a different further aspect, the cart includes a rail mounted to the bottom of the housing and extending along the direction from one end of the housing towards the other, in which each foot is moveable along the rail. In yet a different, further aspect, the cart includes an electrical power source having a rechargeable battery mounted to the housing. In still a different further aspect, the control system controls one of the valves to be closed, while the other valve is open.

Other aspects and advantages will become apparent from the following description, taken in conjunction with the accompanying drawings.

BRIEF DESCRIPTION OF THE DRAWINGS

The various features of the present disclosure will now be described with reference to the drawings of the various aspects disclosed herein. In the drawings, the same components may have the same reference numerals. Note that the drawings are not intended to be to scale or show actual quantities of components or relative sizes. The illustrated aspects are intended to illustrate, but not to limit the present disclosure. The drawings include the following figures.

DETAILED DESCRIPTION

As a preliminary note, the terms "component", "module", "system," and the like as used herein are intended to refer to a computer-related and/or information processing entity, either software-executing general or special purpose processor, hardware, firmware and/or a combination thereof. For example, a component may be, but is not limited to being, a process running on a hardware processor, a hardware processor, an object, an executable, a thread of execution, a program, and/or a computer. For example, a controller or control system may be implemented in software, hardware, and/or a combination thereof, and may include a group of two or more control systems working cooperatively.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), solid state memory device or any other storage device, in accordance with the claimed subject matter.

Figure 1:
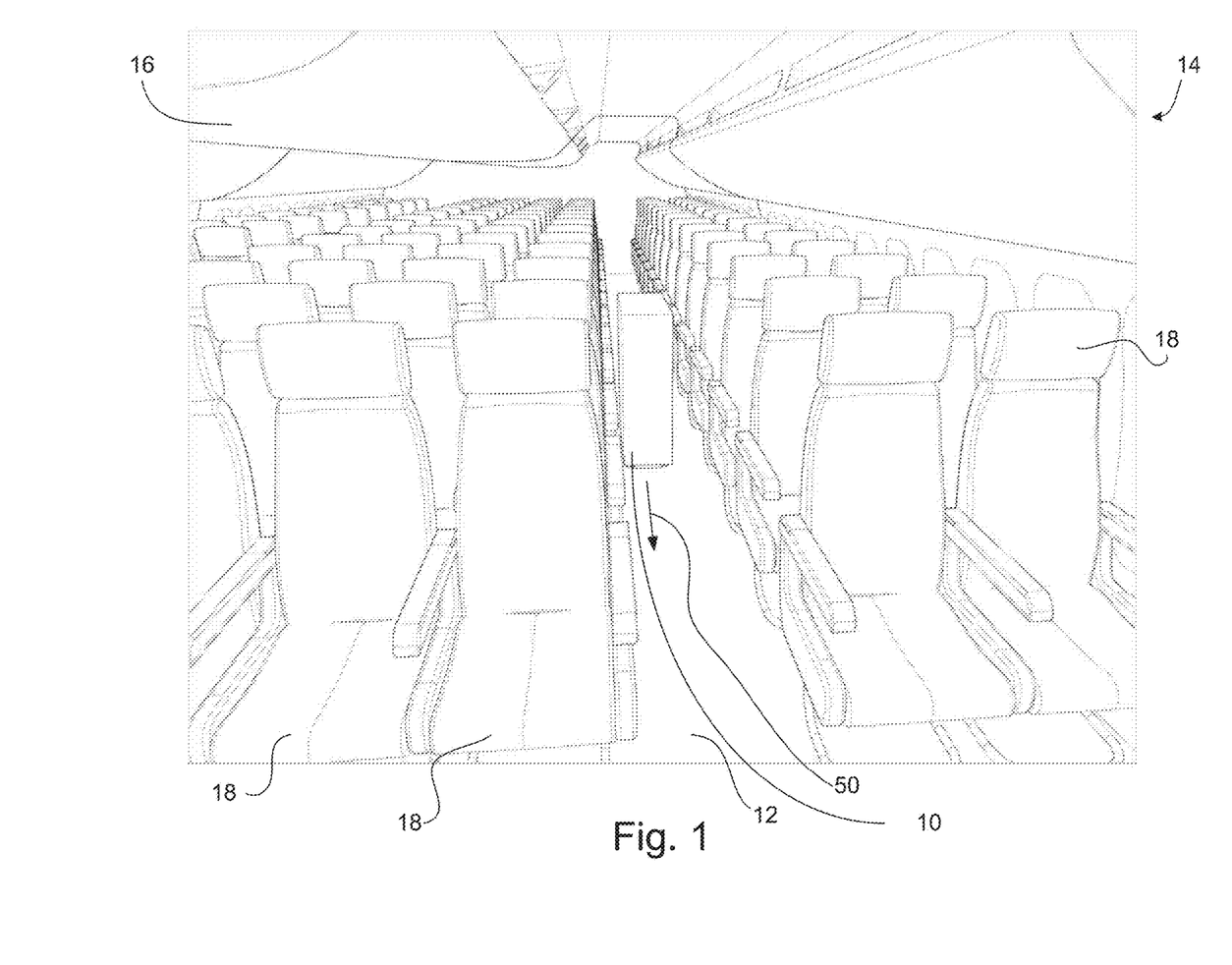
FIG. 1 is a schematically illustrates a perspective view of a portion of the passenger cabin of an airplane with a cart moving along an aisle between columns of seats.

In one aspect, the following disclosure describes a method for moving a cart 10 along a surface 12 of a vehicle 14 as schematically illustrated in FIG. 1. In particular, FIG. 1 illustrates a perspective view of a portion of the passenger cabin of an airplane 16, with the cart 10 moving along the aisle between columns of seats 18. While FIG. 1 illustrates the vehicle 14 as an airplane 16, the vehicle may be of any type, such as an airplane, ship, train, ferry, bus, or other type of vehicle having a surface 12 over which a cart 10 may be moved. The cart 10 may also be used in stationary environments, such as in a building, warehouse, dock, and other environments.

FIGS. 2-5 illustrate perspective views of the cart 10 from FIG. 1 removed from the vehicle 14. With reference to FIGS. 2-5, the method includes using wheels 20 to support a housing 22 of the cart 10 above the surface 12 of the vehicle 14 in which the housing includes a bottom 24. In particular, the wheels 20 are rotatably mounted to the bottom 24 of the housing and project downward to support the housing 22 above the surface 12 of the vehicle 14. The method also includes mounting a first pad or foot 26 and a second pad or foot 26 to the bottom 24 of the housing 22, in which each foot includes a recess 28 facing towards the surface 12 of the vehicle 14. In addition, each foot 26 is mounted so that it is moveable along the bottom 24 of the housing 22.

The method includes pressing one of the feet 26 against the surface 12 by reducing the pressure within the recess 28 thereof relative to ambient pressure around the cart, and moving the housing 22 relative to the one foot along a direction in vehicle 14. With respect to FIG. 1, the direction is along the aisle between the columns of seats 18. Reducing the pressure within the recess 28 presses the foot 26 against the surface 12 due to the greater ambient pressure acting against the external surfaces of the foot. The foot 26 is therefore held or adhered to the surface 12 of the vehicle 14 due to the pressure differential between that in the recess 28 and the external environment.

Figure 6:
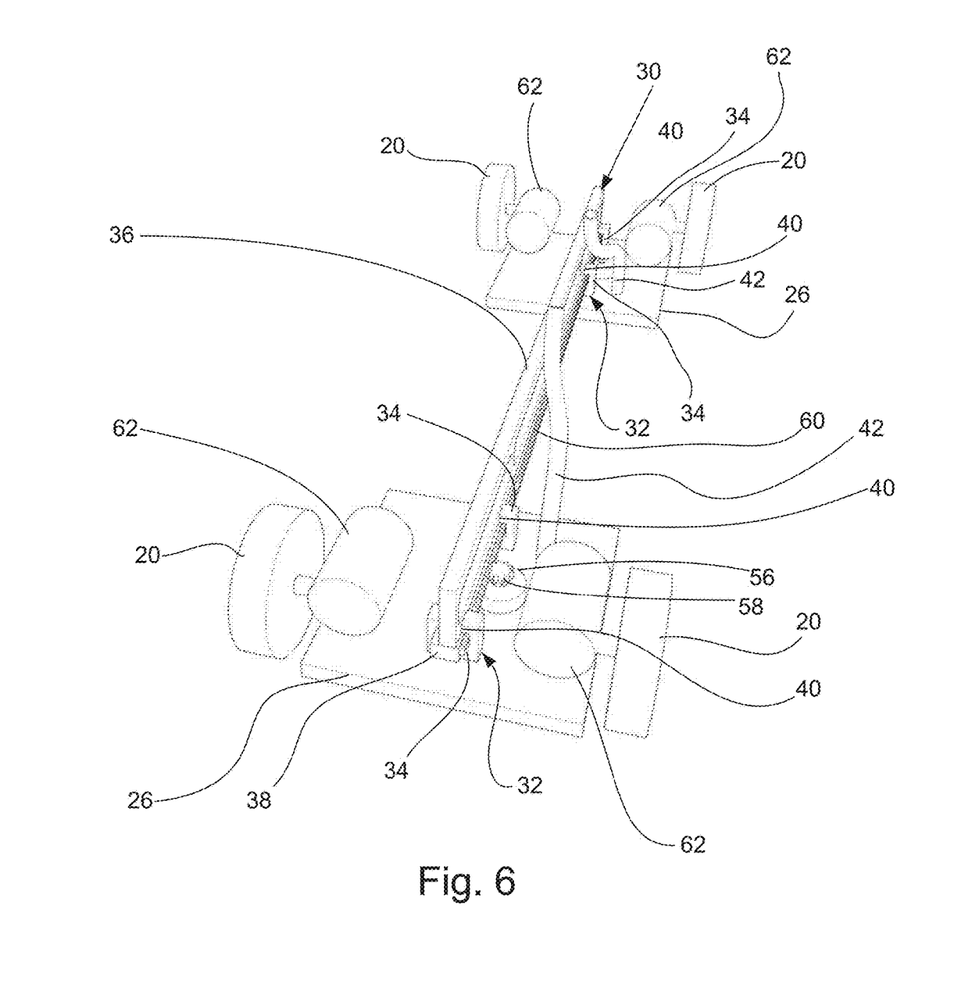
FIGS. 6 and 7 schematically illustrates a partial perspective view of a portion of the cart, with the housing and some other components to removed.

In a further aspect, the method includes providing a rail 30 on the bottom of the housing 22 attaching each foot 26 to a carriage 32 in which the carriage is mounted to the rail. In this regard, FIG. 6 illustrates a partial perspective view of a portion of the cart 10 with the housing 22 and some other components removed from the cart. Each carriage 32 includes a pair of U-shaped members 34 slidably mounted on the rail 30. In particular, the rail includes a vertical member 36 having attached at the bottom edge of the vertical member a horizontal member 38, forming an inverted T-shape. The arms of each U-shaped member 34 extend upward around the horizontal member 36 of the rail 30, and slidably hang thereon via an inwardly extending lip 40 at the end of each arm of the U-shaped members. The lower end of each U-shaped member 34 connects to a foot 26, thereby slidably mounting each foot 26 to the rail 30.

Figure 7:
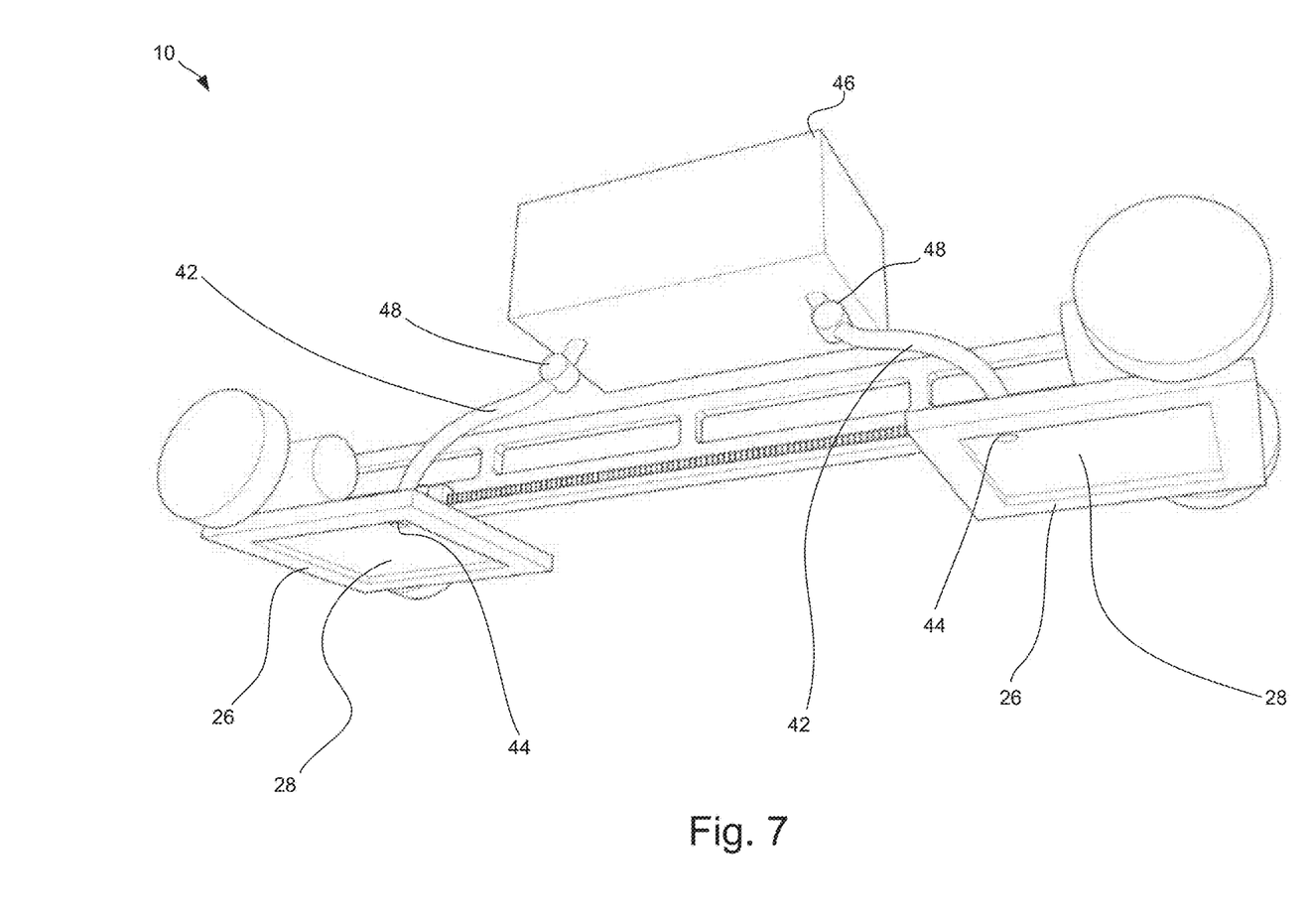

Holding or pressing one of the feet to the surface 12 includes connecting a low pressure source 46 in fluid communication with the recess 28 in the foot to reduce the pressure in the recess below ambient. The recess 28 is connected in fluid communication with the low pressure source via a fluid communication pathway comprising a tube or hose 42 extending from each recess 28. FIG. 7 illustrates a partial perspective view of the cart 10 looing upward towards the bottom of the cart and illustrates the low pressure source 46 (the low pressure source mounts in the cart housing 22; shown removed from the housing in FIG. 7).

As can be seen in FIG. 7, one end of each hose 42 connects to an opening 44 in the recess 28 of each foot 26. The other end of each hose 42 connects to the low pressure source 46. Each tube or hose 42 includes a valve 48. The method includes connecting the low pressure source 46 in fluid communication with the recess 28 in each foot 26 by selectively opening and close each valve 48. When a valve 48 is closed, the valve closes the fluid communication pathway to its respective recess 28 in a foot 26. The pressure in the recess 28 therefore returns to ambient as air leaks in from the surrounding environment and the pressure inside and outside the recess equalizes. When a valve 48 is open, the valve opens the fluid communication pathway to its respective recess 28 in a foot 26. The pressure in the recess 28 therefore falls below ambient due to being in fluid communication with the low pressure source 46 and the greater ambient pressure presses the foot 26 against the surface 12 of the vehicle 14, thereby holding or adhering the foot to the surface.

Figure 2:
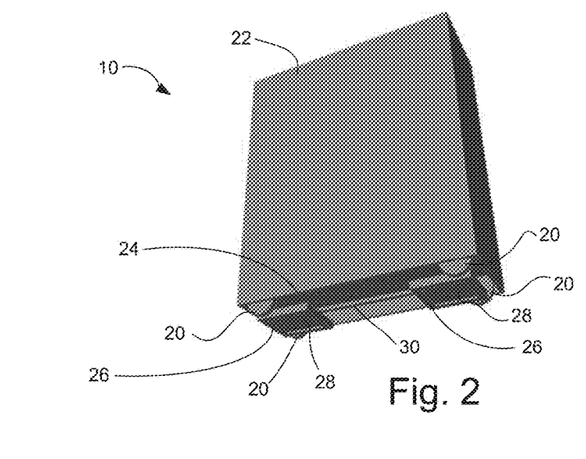
FIGS. 2-5 illustrate perspective schematic views of the cart from FIG. 1 removed from the vehicle.
Figure 3:
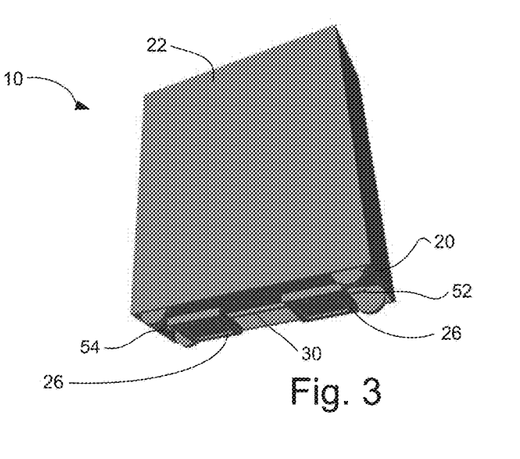

The method includes moving the housing 22 relative to the foot 26 that has been pressed against the surface 12, along a direction 50 in the vehicle 14, such as along an aisle between columns of seats 18 (see FIG. 1). More particularly, FIGS. 2-5 illustrate how the cart 10 is moved along direction 50. In FIG. 2, the rightmost foot 26 of the cart 10 in the drawing figure has been pressed against the surface 12 of the vehicle 14. FIG. 3 illustrates the cart 10 a few moments later after the housing 22 has moved relative to the foot 26 that is pressed or held against the surface 12. In FIG. 3 the housing 22 and rail 30 have rolled to the right relative to the rightmost foot 26 via the wheels 20. For this reason, the right end portion 52 of the rail 30 is visible in FIG. 3, extending past the rightmost foot 26. Simultaneously, the other foot 26 (leftmost foot) is not pressed or held in place and is slid towards the center of the rail 30. Hence the left end portion 54 of the rail 30 is visible in FIG. 3, extending past the leftmost foot 26.

Figure 4:
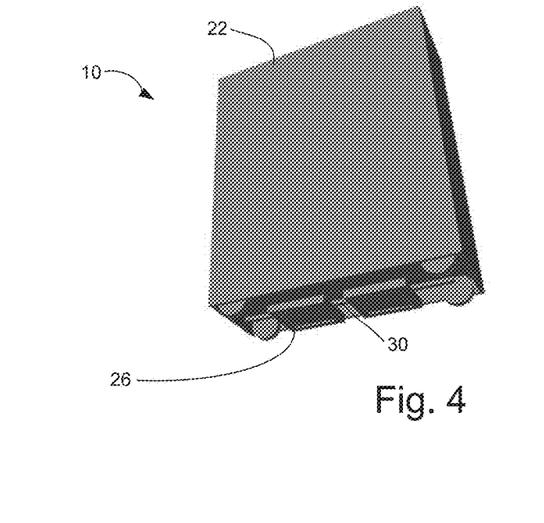

The method includes restoring the pressure to ambient in the recess 28 of the foot 26 being pressed against the surface 12, after the housing 22 has been moved, and pressing the other foot against the surface by reducing the pressure within the recess thereof relative to ambient, and moving the housing relative to said other foot in the same direction. In this regard, FIG. 4 illustrates the cart 10 after the housing 22 has moved further to the right, and both feet 26 are near one another proximate the central portion of the rail 30. At this time, the pressure is restored in the recess 28 of the rightmost foot 26. The pressure is restored by closing the valve 48 in the fluid communication pathway 42 to the low pressure source 46 (see FIG. 7). Once the valve 48 is closed, air from the surrounding environment flows into the recess 48 until the pressure in the recess is equal to ambient.

Figure 5:
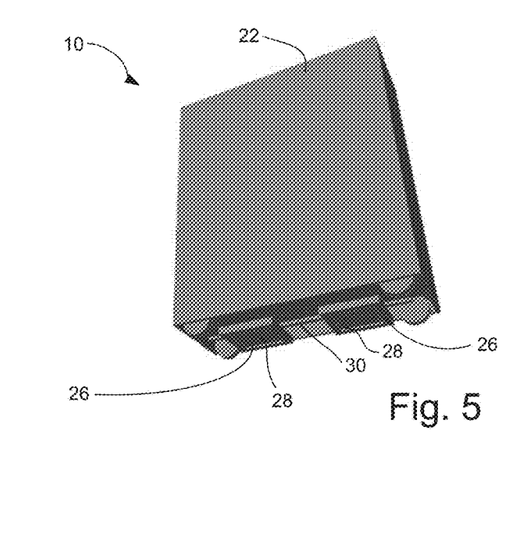

As pressure is restored, the other foot 26 is pressed to the surface 12 by reducing the pressure within the recess 28 thereof relative to ambient by opening the other valve 48. In addition, the housing 22 of the cart 10 is further moved to the right. FIG. 5 illustrates the cart 10 after the housing 22 has been further moved rightward relative to the position in FIG. 4. As can be seen in FIG. 5, the distance between the feet 26 along the rail 30 has increased. The housing 22 is moved rightward until the position of each foot 26 relative to the rail 30 returns to that of FIG. 2, where the method includes repeating the foregoing pressing and restoring until the housing 22, i.e., the cart 10 has reached a desired location in the vehicle 14.

In a further aspect, the method includes monitoring for turbulence, shaking, tipping, and sudden movements or changes in orientation of the vehicle 14. Aircraft for example, frequently encounter turbulence, and if the turbulence is severe enough, the captain directs passengers to return to their seats and remain there with seatbelts fastened until the turbulence subsides. For safety, the method includes monitoring for turbulence, and if there is turbulence, pressing both feet 26 to the surface 12 of the vehicle 14 by reducing the pressure in the recess 28 of each foot concurrently. That is, both valves 48 are opened such that the recess 28 of each foot 26 is connected in fluid communication with the low pressure source 46 simultaneously. Pressing both feet 26 to the surface 12 provides for extra stability for the cart 10 in the event of turbulence or shaking of the vehicle 14 or sudden movements or changes in vehicle orientation.

In yet a further aspect, moving the housing 22 includes using at least one motor 56 as shown in FIG. 6. In particular, each foot includes a motor 56 mounted on the upper surface of the foot. The motor 56 includes a gear 58 that rotates when the motor is operated. The gear 58 engages ribs or threads 60 formed along the length of the rail 30. When the motor 58 operates, it rotates the gear 58 in which the gear 58 engages the threads 60 on the rail 30 to move the foot 26 and rail 30 relative to one another. As the rail 30 is mounted to the housing 22, the housing and rail move together. If the foot 26 is pressed or held to the surface 12 of the vehicle 14, the housing 22 moves relative to the surface. If the foot 26 is not pressed/held to the surface 12, and the other foot is pressed/held against the surface 12, the other foot 26 moves along the rail 30 relative to the surface 12.

The housing 22 further includes a motor 62 mounted to the housing and connected to drive each wheel 20. As the wheels 20 and wheel motors 62 mount to the housing 22 and not the feet 26, the wheel motors 62 may also be used to move the housing 22 relative to each foot. The wheel motors 62 are independently controllable and may be used to turn the cart 10 by operating one motor 62 at a greater speed than another. One wheel motor 62 may be operated to rotate its corresponding wheel 20 in a direction opposite that from the wheel 20 on the other side of the housing 22 for a tighter turning radius.

Figure 8:
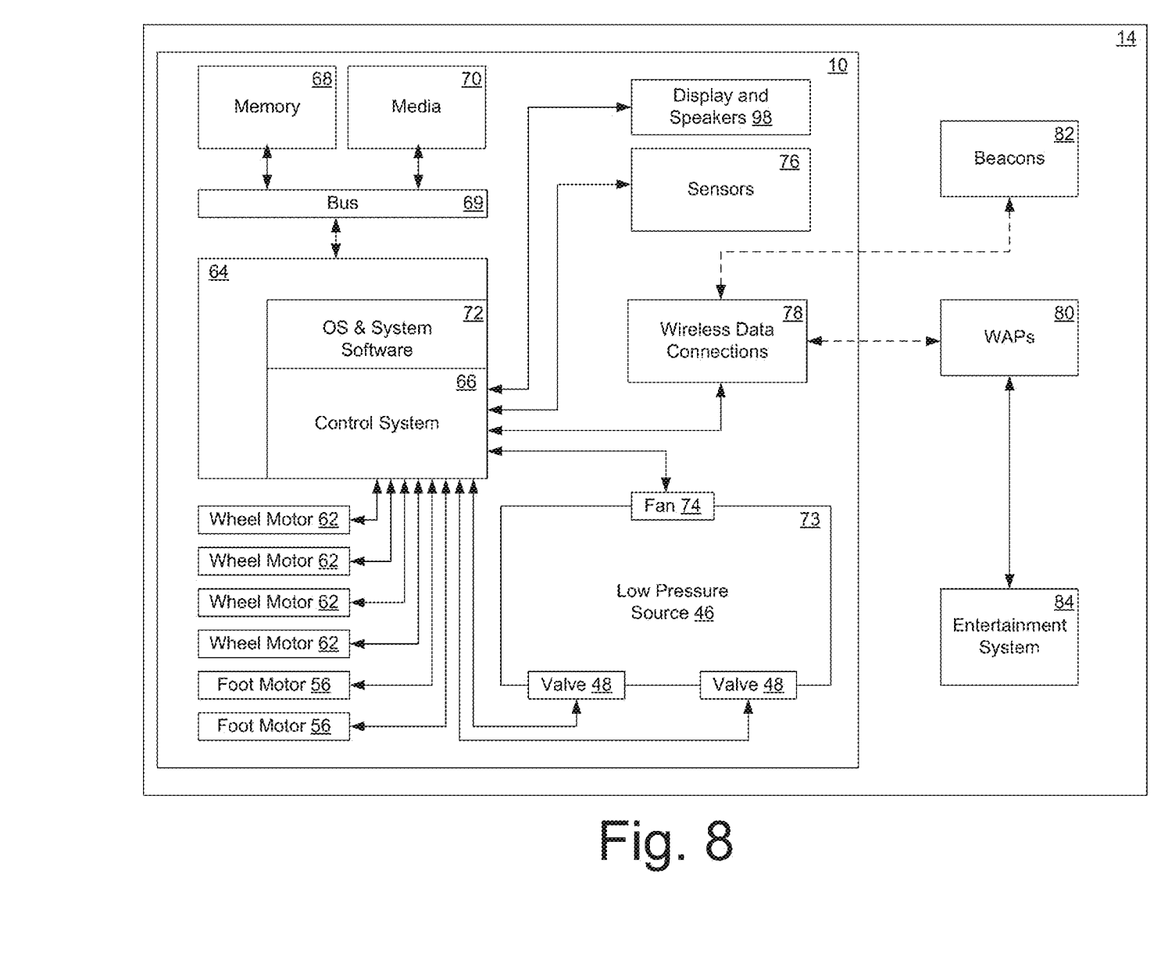
FIG. 8 is a schematic illustration of the control system of the cart and wireless communication with beacons in the vehicle and the vehicle entertainment system.

In another aspect, the disclosure describes a cart 10 for moving along a surface 12 in a vehicle 14 in which the cart includes a data processor 64 and a control system 66 executed by the data processor as schematically illustrated in FIG. 8. A memory 68 is connected in communication with the processor 32 via a bus 69. The memory 68 may be SDRAM, NVRAM, a combination thereof, or other type. The cart 10 also includes storage media 70 connected to the data processor 64 for non-volatile storage of data when the data processor 64 is powered down and power is not available to maintain memory in RAM. The storage media 70 may be flash memory, an SSD, hard disk drive, or other type of media for non-volatile storage of data. A ROM or EEPROM may be included for non-volatile data storage as well, either alone or in combination with other non-volatile storage media. In addition, an operating system (OS) and system software 72 is executed by the data processor 64. The processor 64 is preferably a low power type, such as an ARM processor, but may be other types as well, such as an Intel or AMD type processor, preferably a type intended for low power or mobile use, and may comprise one or processors for parallel processing, and/or a GPU in communication with the data processor.

The control system 66 is connected in bidirectional communication with each of the motors 62 for the wheels 20, the motors 58 on each foot 26 for driving the gears 56, and each valve 48. Bidirectional communication provides for greater reliability in that the control system 66 can monitor when a motor 56 or 62 is being operated, for how long, the distance traveled, and whether a valve 48 is open or closed, and malfunctions or error conditions communicated to the control system. The control system 66 controls each motor 56 of a foot 26 to move the foot 26 thereof back and forth along the direction 50, i.e., along the rail 30. The control system 66 controls the valve 48 to remain closed for the fluid communication pathway 42 connected to the recess 28 of one foot 26 as the foot moves relative to the bottom of the housing 22, while controlling the other valve 48 to remain open as the other foot moves relative to the housing 22. As described earlier, the cart 10 includes a rail 30 mounted to the bottom of the housing 22 and extending along the direction the feet move, i.e., along the rail 30. In particular, a first carriage 32 connects one foot 26 to the rail 30, and a second carriage 32 connects the other foot 26 to the rail.

The low pressure source 46 includes a vacuum chamber 73 in which a fan 74 is mounted in an opening of the chamber. Each fluid communication pathway 42 is connected in fluid communication with the chamber 73. Operation of the fan 74 draws air from the chamber 73, reducing the pressure therein relative to ambient. A valve 48 is disposed in each fluid communication pathway 42. The control system 66 opens and closes the valve 48 in each pathway 42 to connect each recess 28 in fluid communication with, and disconnect the recess from fluid communication with the chamber 73. The fan 74 may be from a conventional vacuum cleaner or other type.

The control system 66 further connects to sensors 76 in the cart 10 to monitor for vibration or turbulence. Sensing for turbulence may be an accelerometer. The sensors may include level detection to prevent tipping. In particular, if the surface 12 of the vehicle departs greater than a predetermined amount from horizontal, the control system 74 stops operation of the motors 56 and 62, operates the fan 74, and closes both valves 48 to press or hold both feet to the surface 12. The control system 66 responds the same way in the event of turbulence beyond a predetermined amount. The sensors 76 may also include GPS and cameras for cart navigation. In addition, the cart 10 includes wireless data connections 78 for connectivity with wireless access points 80 in the vehicle and beacons 82. The beacons are based on short range communication protocols, such as NFC, Bluetooth, RFID, etc., for aiding in more precise cart 10 navigation within the vehicle 14 (dotted lines indicate wireless communication). The wireless data connections 78 further provides for connectivity via Zigbee, Z-Wave, Kidde, and Lutron integration protocols for detection and communication with connected devices in the vehicle 14. The WAPs 80 connect to the vehicle entertainment system 84, preferably via a wired connection, but may be wireless as well, for making additional information available for use by the control system 66 of the cart 10. For instance, vehicle crew may activate a turbulence warning via the vehicle entertainment system 84, which is communicated to the cart 10 via a WAP 80. In response to receipt of the warning, the cart control system 66 operates the fan 74, opens both valves 48, and deactivates the motors 52 and 62 to ensure cart stability.

Figure 9:
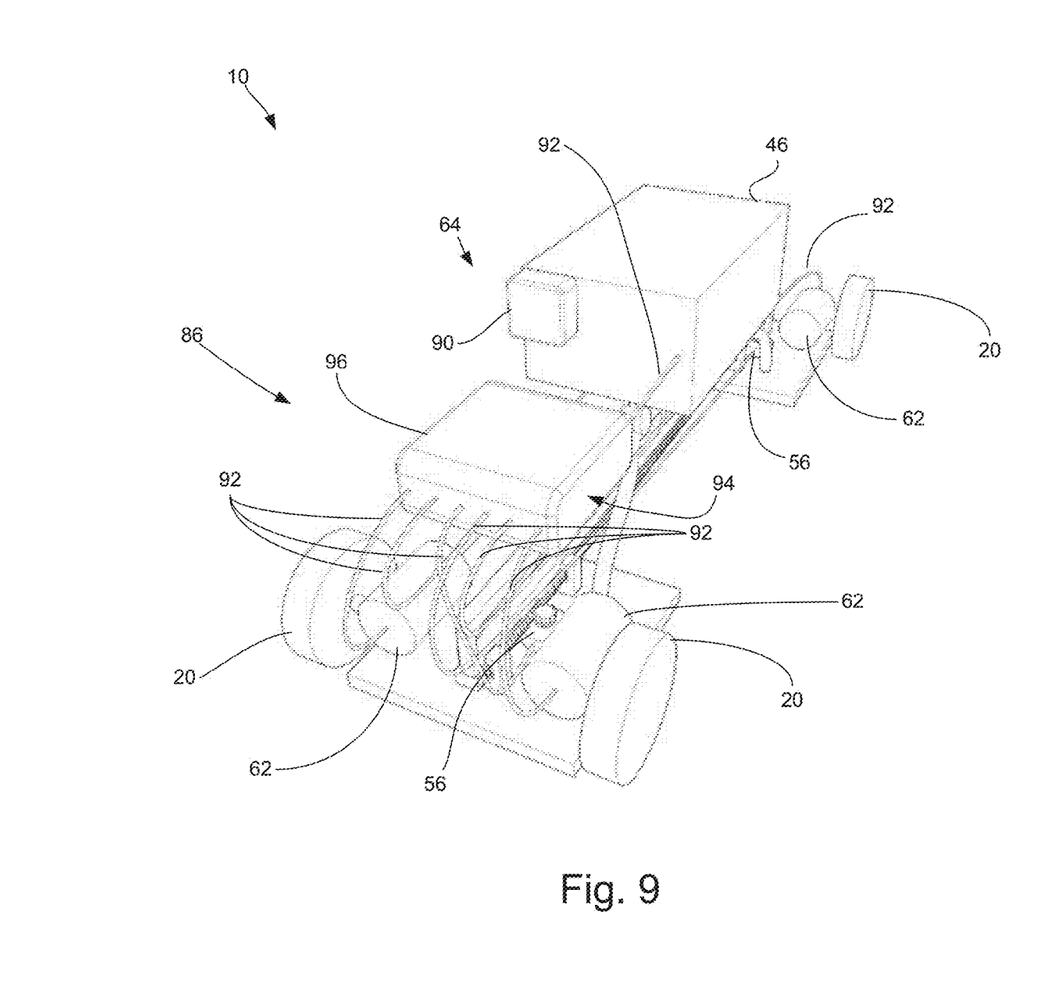
FIG. 9 schematically illustrates another partial perspective view of a portion of the cart with the housing and some other components of the cart removed.

The cart 10 includes an electrical power source 86 as shown in FIG. 9. In particular, FIG. 9 illustrates a partial perspective view of the cart 10 with the housing 22 removed to show some of the internal components. With continued reference to FIG. 9, the electrical power source 86 electrically connects to the low pressure source 46, each of the motors 52 and 62, and the data processor 64. More particularly, the data processor 64 is mounted in an electronics housing or case 90, along with other information processing components of the cart 10, such as the memory 68, media 70, wireless cards for wireless data connections 78, and at least some sensors 76 (see FIG. 8). The electronics case 90 mounts to the side of the low pressure source 46. Electrical wiring 92 extends from the electrical power source 86 to the low pressure source 46, and runs internally therein to the fan 74 and valves 48 of the lower pressure source. A branch of the wiring 92 runs internally in the lower pressure source 46 and connects to the electronics housing or case 90, and provides power for information processing components therein. Other wiring 92 electrically connects the electrical power source 86 to each of the motors 52 and 62, and other sensors.

The electrical power source 46 includes a rechargeable battery 94 supported in case 96. The rechargeable battery 94 is a battery of one or more cells. The desirable power output and capacity characteristics may be achieved with a lithium-ion type battery, such as lithium cobalt, lithium iron phosphate, lithium nickel cobalt, lithium polymer or other lithium type battery. Due to higher chemical and thermal stability, lithium iron phosphate may be preferred for applications where safety is of paramount concern, such as in aviation, or lithium nickel cobalt aluminum oxide in which the aluminum provides greater chemical stability. Lithium-polymer batteries may be shaped to correspond to the space available in a line replaceable unit. Lithium batteries for aviation applications are available from Sanyo Electric Co. Ltd. of Sumoto City, Japan, in which Sanyo is a subsidiary of Panasonic Corporation. A possible alternative to lithium batteries is a fuel cell or cells. In either case, sufficient energy to power the various components of the cart 10, is preferable for at least three hours, and more preferably, a minimum of six hours.

As the battery 94 is preferably rechargeable, the cart 10 may include a charging circuit connected thereto with a detachable connection to the main electrical system of the vehicle 14 for convenient recharging of the battery 94. In particular, the cart 10 may be provided with a docking station in the vehicle 14 in which an electrical connection is established between the vehicle electrical system and the battery 94 when the cart 10 is docked. In this configuration, the charging circuit is preferably included with the dock to reduce the weight of the cart 10 and provide more storage space for service items. Alternatively, the charging circuit may be included with the cart 10 and provided with a cord for connection to an electrical outlet of the vehicle 14.

The charging circuit is contemplated to monitor the charging level, the temperature, and other conditions of the battery 94, and include indicators therefor. When charging is completed, or when the battery 94 is in a dangerous condition, the charging circuit can discontinue charging. In an alternative configuration, the battery 94, either alone or in combination with the battery case 96, may be formed as a detachable unit such that it is removeable from the cart 10 for charging. Multiple batteries 94 or units may be provided, such that a depleted battery may be removed, and replaced with a fully charged battery so that the cart 10 remains powered by another battery while the depleted battery is being charged.

The sensors 76 in combination with the control system 66 permit the cart 10 to navigate autonomously through the vehicle 14. The housing 22 includes a storage area for storing canned and bottled beverages for passengers, and snacks. Passengers submit orders through the entertainment system 84 via personal electronic devices (PEDs) carried aboard the vehicle 14. In particular, passengers use the PEDs to establish communication with a WAP 80 to submit a request to the entertainment system 84 for a beverage, snack, meal, or other service items. Alternatively, passengers could submit requests to the entertainment system 84 via display devices mounted on the backs of seats 18, bulkheads, armrests, or other locations. Onboard duty free items could also be requested via display devices or passenger PEDs, and payment made using a credit reader in a display device, or entering payment information with a PED or virtual keyboard on the display device. If an item is not available in a cart 10, carts can communicate with one another via wireless data connections to maintain an inventory sorted by cart such that a cart having the requested item in inventory may be sent to a passenger seat location to fulfil the request.

Returning to FIG. 8, the cart 10 includes an electronic display and speakers 98. The display and speakers 98 are for communication with passengers, such as announcing delivery of requested service items and safety messages, for example, notifying passengers to return seatback trays to their upright and stowed positions, seats to their fully upright positions, and to fasten seatbacks in preparation for landing, takeoff, and/or other condition requiring enhanced safety.

In this regard, the sensors 76 include cameras for detecting seats that are at least partially reclined and/or tray tables that are deployed. In addition, the vehicle 14 may include sensors connected to the seats 18 and tray tables to detect reclined and deployed positions, which communicate with the cart 78 via Zigbee, Z-wave, Kidde, and/or Lutron integration protocol, i.e., communication in accordance with protocols commonly used for the "Internet-of-Things" or "IoT." Via IoT the cart 10 may also communicate with sensors in seatbelts to detect unfastened seatbelts. Alternatively, the entertainment system 84 may communicate with sensors in seats, seatbelts, tray tables, and other objects, and communicate the information to the cart 10 via a WAP 80 in communication with wireless data communications 78 of the cart.

The sensors 76 further include a GSM or CDMA sensor to detect cellular transmissions from a PED. If a cellular transmission is detected, the control system 66 navigates the cart 10 to a location along a vehicle aisle near the detected location and requests that PEDs be placed in airplane mode (assuming the vehicle 14 is presently in a jurisdiction prohibiting cellular transmissions while in flight). The request is made using visual information shown on the display to accommodate passengers that may have hearing disabilities, as well as using the speakers, to accommodate passengers with visual disabilities.

Various changes and modifications can be made as will be recognized by those of ordinary skill in the art. While the cart 10 has been described for use with a vehicle 14, it could be used for stationary applications as well, such as providing services in a building. A low pressure source 46 may be provided for each foot 26 and the valves eliminated 48 in which the fan 74 of each low pressure source is activated and deactivated to press each foot to the surface 12 of the vehicle 14. The battery 94 has been described as lithium based, but may of other types, such a lead-acid, or later developed types. While the cart 10 has been described as including a motor 62 corresponding to each wheel 20, the quantity of motors could be reduced to a single motor 62 driving a pair of the wheels 20. Alternatively, the wheel motors 62 could be removed, and the cart 10 could be driven by the motors 56 for the feet 26. Instead of wheels, treads or belts could be used for improved traction with the surface 12. Instead of pressing each foot 26 against a surface by use of reduced pressure in a recess 28, electromagnetics could be used. Alternatively, telescoping rods could extend from the cart 10 to detachably connect to the support structure of seats 18 as the cart moves from one row of seats to another between seat columns.

As changes can made, the foregoing disclosure and examples described therein are to be considered as illustrative and not restrictive and the invention is not to be limited to the details given herein, but may be modified within the scope and equivalence of the appended claims.

The invention claimed is:
1. A cart for moving along a surface in a vehicle, the cart comprising:
   a housing including a top and bottom, and opposite ends;
   a first foot and a second foot mounted to the bottom of the housing, each foot being moveable back and forth from a direction away from one end of the cart towards the other end, each foot including a recess opening downwardly away from the bottom of the housing;
   a low pressure source mounted in the housing;
   a fluid communication pathway extending from an opening within each recess to the low pressure source, each fluid communication pathway including a valve operable for opening and closing that valve's respective fluid communication pathway between the recess and the low pressure source;
   a motor connected to one foot and another motor connected to the other foot, each motor being operable for moving that motor's respective foot back and forth along said direction;
   a data processor and control system executed by the data processor, the control system being connected in communication with each motor and each valve, the control system controlling each motor to move that motor's respective foot back and forth along said direction, the control system controlling the valve to remain closed for the fluid communication pathway connected to the recess of one foot as the foot moves relative to the bottom of the housing, while controlling the other valve to remain open as the other foot moves relative to the housing; and
   an electrical power source connected to the low pressure source, the motors, and data processor, providing electrical power to the low pressure source, motors, and data processor.

2. The cart of claim 1, further comprising a rail mounted to the bottom of the housing and extending along said direction, in which each foot is moveable along the rail.

3. The cart of claim 2, further comprising a carriage connecting one foot to the rail, and another carriage connecting the other foot to the rail, in which one of the motors is operable for driving one of the carriages back and forth along the rail, along with the foot connected to that carriage, and the other motor is operable for driving the other carriage back and forth along the rail.

4. The cart of claim 3, further comprising wheels mounted to the bottom of the housing, and at least one other motor connected to at least one wheel operable for driving the at least one wheel.

5. The cart of claim 2, wherein the rail includes first and second halves, and one foot moves along one half of the rail and the other foot moves along the other half of the rail.

6. The cart of claim 1, further comprising wheels mounted to the bottom of the housing, which roll as the housing moves along the surface of the vehicle.

7. The cart of claim 1, wherein the low pressure source comprises a chamber, the chamber including a fan disposed to draw air from the chamber when the fan is operated, with each fluid communication pathway connected in fluid communication to the chamber.

8. A cart for moving along a surface in a vehicle, the cart comprising:
   a housing including a top and bottom, and opposite ends;
   a first foot and a second foot mounted to the bottom of the cart, each foot being moveable back and forth from a direction away from one end of the housing towards the other end, each foot including a recess opening downwardly away from the bottom of the housing;
   a low pressure source mounted in the housing;
   a fluid communication pathway extending from an opening within each recess to the low pressure source, each fluid communication pathway including a valve operable for opening and closing that valve's respective fluid communication pathway between the recess and the low pressure source;
   a motor connected to one foot, and another motor corrected to the other foot, each motor being operable for moving the foot connected thereto back and forth along said direction;
   a data processor and control system executed by the data processor, the control system being connected to the motor and each valve, the control system controlling each motor to reciprocate the foot connected thereto back and forth along said direction in coordination with opening and closing of the valves, the control system preventing movement of the housing along the surface of the vehicle by opening both valves at the same time; and
   an electrical power source connected to the low pressure source, motors, and data processor, providing electrical power to the low pressure source, motors, and data processor.

9. The cart of claim 8, further comprising wheels connected to the bottom of the housing.

10. The cart of claim 8 further comprising a rail mounted to the bottom of the housing and extending along said direction, in which each foot is moveable along the rail.

11. The cart of claim 10, further comprising a carriage connecting one of the feet to the rail, and another carriage connecting the other foot to the rail, wherein the motors reciprocate the carriages along the rail to reciprocate the feet along the rail.

12. The cart of claim 10, wherein the rail includes first half and a second half, wherein one foot is moveable along one half of the rail and the other foot is moveable along the other half of the rail.

13. The cart of claim 8, wherein the electrical power source includes a rechargeable battery mounted to the housing.

14. The cart of claim 8, wherein the control system controls one of the valves to be closed, while the other valve is open.

15. A method for moving a cart along a surface in a vehicle, the method comprising:
  using wheels to support a housing on the surface, the housing including a bottom;
  mounting a first foot and a second foot to the bottom of the housing, in which each foot includes a recess facing towards the surface of the vehicle, and each foot being moveable along the bottom of the housing;
  pressing one of the feet against the surface by reducing the pressure within the recess thereof relative to ambient, and moving the housing relative to the one foot along a direction in the vehicle;
  restoring the pressure in the recess of said one of the feet to ambient after the housing has been moved, pressing the other foot against the surface by reducing the pressure within the recess thereof relative to ambient, and moving the housing relative to said other foot in the same direction; and
  repeating said pressing and said restoring until the housing has been reached a desired location in the vehicle.

16. The method of claim 15, said adhering one of the feet includes connecting a low pressure source in fluid communication with the recess in the foot to reduce the pressure in the recess below ambient.

17. The method of claim 15, further comprising:
  monitoring for turbulence; and
  if there is turbulence, pressing both feet against the surface of the vehicle by reducing the pressure in the recess of each foot concurrently.

18. The method of claim 15, wherein moving the housing includes using at least one motor.

19. The method of claim 15, further comprising disposing a data processor in the housing and executing a control system on the data processor to coordinate said pressing, said restoring, and said repeating.

20. The method of claim 15, wherein said mounting a first foot and a second foot includes providing a rail on the bottom of the housing and attaching each foot to a carriage mounted to the rail.

* * * * *